United States Patent
Sutou (10) Patent No.: US 10,042,497 B2
(45) Date of Patent: Aug. 7, 2018

(54) SHEET-LIKE CONDUCTOR AND TOUCH PANEL USING SAME

(71) Applicant: FUJIFILM Corporation, Tokyo (JP)

(72) Inventor: Makoto Sutou, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/253,147

(22) Filed: Aug. 31, 2016

(65) Prior Publication Data

US 2016/0370901 A1 Dec. 22, 2016

Related U.S. Application Data

(63) Continuation of application No. PCT/JP2015/056606, filed on Mar. 6, 2015.

(30) Foreign Application Priority Data

Mar. 28, 2014 (JP) .................................. 2014-069829

(51) Int. Cl.
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC ............ G06F 2203/04112; H05K 2201/09681
See application file for complete search history.

(56) References Cited

U.S. PATENT DOCUMENTS

2009/0219257 A1* 9/2009 Frey .................. G06F 3/044
345/173

2014/0118009 A1* 5/2014 Cheng .................. G06F 3/044
324/658

(Continued)

FOREIGN PATENT DOCUMENTS

JP 2011-175967 A 9/2011

OTHER PUBLICATIONS

International Search Report for PCT/JP2015/056606 (PCT/ISA/210) dated Apr. 21, 2015.

(Continued)

*Primary Examiner* — Benjamin C Lee
*Assistant Examiner* — Dong Hui Liang
(74) *Attorney, Agent, or Firm* — Birch, Stewart, Kolasch & Birch, LLP

(57) ABSTRACT

A sheet-like conductor that is arranged on a display screen includes at least an insulator, a first detection electrode that is placed on a surface of the insulator on an opposite side to the display screen and arranged on a viewing side, and a second detection electrode that is placed on a surface of the insulator on a side close to the display screen and arranged on an opposite side to the viewing side, in which the first detection electrode and the second detection electrode are formed of thin metal wires in a mesh shape, and when a line width of the thin metal wire of the first detection electrode is a line width Wa and a line width of the thin metal wire of the second detection electrode is a line width Wb, the line width Wa and the line width Wb satisfy the following expressions (1) and (2).

$$0.5 \ \mu m \leq Wb < Wa \leq 10 \ \mu m \quad (1)$$

$$Wa - Wb \leq 4.0 \ \mu m \quad (2)$$

20 Claims, 4 Drawing Sheets

(56) References Cited

U.S. PATENT DOCUMENTS

2015/0177872 A1\* 6/2015 Kim .................. G06F 3/044
                                                345/174
2015/0205422 A1\* 7/2015 Choi ................. G06F 3/041
                                                345/173
2016/0231861 A1\* 8/2016 Nagata ............... G06F 3/044

OTHER PUBLICATIONS

Written Opinion of the International Searching Authority for PCT/JP2015/056606 (PCT/ISA/237) dated Apr. 21, 2015.
International Preliminary Report on Patentability and English translation of the Written Opinion of the International Searching Authority, (Forms PCT/IB/338, PCT/IB/373 and PCT/ISA/237), dated Oct. 13, 2016, for International Application No. PCT/JP2015/056606.

\* cited by examiner

SHEET-LIKE CONDUCTOR AND TOUCH PANEL USING SAME

CROSS-REFERENCE TO RELATED APPLICATIONS

This application is a Continuation of PCT International Application No. PCT/JP2015/056606 filed on Mar. 6, 2015, which claims priority under 35 U.S.C. § 119(a) to Japanese Patent Application No. 2014-069829 filed on Mar. 28, 2014. The above application is hereby expressly incorporated by reference, in its entirety, into the present application.

BACKGROUND OF THE INVENTION

1. Field of the Invention

The present invention relates to a sheet-like conductor including a detection electrode on a viewing side and a detection electrode on the opposite side thereto, which are formed of thin metal wires in a mesh shape, respectively, and a touch panel using the same.

2. Description of the Related Art

Conventionally, in a touch panel display or the like, a touch panel sensor composed of a sheet-like conductor such as a conductive sheet including a mesh-like detection electrode having a two-layer structure and formed of thin metal wires has been used (for example, refer to JP2011-175967A).

In JP2011-175967A, there are disclosed an invention of a conductive sheet having a substrate, a first conductive portion that is formed on one principal surface of the substrate using thin metal wires, and a second conductive portion that is formed on the other principal surface of the substrate using thin metal wires, and the fact that a line width of the thin metal wire of the first conductive portion (the line width of the first conductive pattern) is the same as a line width of the thin metal wire of the second conductive portion (the line width of the second conductive pattern).

SUMMARY OF THE INVENTION

However, as disclosed in JP2011-175967A, for example, in the conductive sheet in which the line width of the thin metal wire of the first conductive portion which becomes the detection electrode on the viewing side and the line width of the thin metal wire of the second conductive portion which becomes the detection electrode on the opposite side thereto are equal to each other, in the case in which the conductive sheet is placed on a black plate, for example, in the case in which, in a touch panel display, the power of the display is off and a black screen display is shown there arises a problem in that the thin metal wires of the conductive sheet are visually recognized.

Incidentally, it is expected that in the sheet-like conductor including the detection electrode on the viewing side (for example, an upper side) and the detection electrode on-the opposite side thereto (for example, a lower side), which are formed in a mesh shape using thin metal wires that are not transparent, from the viewpoint of visibility of the thin metal wires of the upper side detection electrode and the lower side detection electrode, in consideration of a distance from an observer, the line width of the thin metal wire of the lower side detection electrode at a position far from the observer is made larger than the line width of the thin metal wire of the upper side detection electrode and the line width of the thin metal wire of the upper side detection electrode and the line width of the thin metal wire of the lower side detection electrode seem to be equal to each other in the case of being observed from the observer.

However, according to the investigation conducted by the present inventors, it is found that when a sheet-like conductor, in which the line width of the thin metal wire of the lower side detection electrode at a position far from the observer is made larger than the line width of the thin metal wire of the upper side detection electrode considering a distance from the observer, is manufactured, there arises a problem in that desired visibility performance cannot be obtained as in the case of JP2011-175967A.

An object of the present invention is to solve the problems in the related art and to provide a sheet-like conductor capable of improving visibility due to a mesh-like electrode formed of thin metal wires without deteriorating transmittance, and a touch panel using the same.

The present inventors have noticed that as a result of observing a sheet-like conductor by making the line widths of thin metal wires of a first detection electrode on a viewing side and a second detection electrode on the opposite side thereto, which are formed of thin wires in a mesh shape, the same, as typically carried out, irrespective of the same line width, the thin metal wire of the second detection electrode is noticeably recognized.

Considering the above problems and findings, the present inventors have found that by making the line width of the thin metal wire of the second detection electrode at a position far from an observer smaller than the line width of the thin metal wire of the first detection electrode, the visibility of the sheet-like conductor can be improved without deteriorating transmittance and thus completed the present invention.

That is, according to a first aspect of the present invention, there is provided a sheet-like conductor that is arranged on a display screen, the conductor comprising at least an insulator, a first detection electrode that is placed on a surface of the insulator on an opposite side to the display screen and arranged on a viewing side, and a second detection electrode that is placed on a surface of the insulator on a side, close to the display screen and arranged on an opposite side to the viewing side, in which the first detection electrode and the second detection electrode are formed of thin metal wires in a mesh shape, and when a line width of the thin metal wire of the first detection electrode is a line width Wa and a line width of the thin metal wire of the second detection electrode is a line width Wb, the line width Wa and the line width Wb satisfy the following expressions (1) and (2).

$$0.5 \ \mu m \leq Wb < Wa \leq 10 \ \mu m \quad (1)$$

$$Wa - Wb \leq 4.0 \ \mu m \quad (2)$$

It is preferable that the line width Wa and the line width Wb have a relationship of the following expression (3).

$$0.5 \ \mu m \leq Wa - Wb \leq 2.0 \ \mu m \quad (3)$$

It is preferable that the line width Wa and the line width Wb satisfy the following expression (4).

$$1.0 \ \mu m \leq Wb < Wa \leq 6.0 \ \mu m \quad (4)$$

It is preferable that an inter-wire pitch between the thin metal wires of each of the first detection electrode and the second detection electrode is 100 μm to 500 μm.

It is preferable that an electrode width of the first detection electrode is smaller than an electrode width of the second detection electrode.

According to a second aspect of the present invention, there is provided a sheet-like conductor comprising at least an insulator, a first detection electrode that is placed on one surface of the insulator, and a second detection electrode that is placed on the other surface of the insulator, in which the first detection electrode and the second detection electrode are formed of thin metal wires in a mesh shape, when a line width of the thin metal wire of the first detection electrode is a line width Wa and a line width of the thin metal wire of the second detection electrode is a line width Wb, the line width Wa and the line width Wb satisfy the following expressions (1) and (2), and an electrode width of the first detection electrode is smaller than an electrode width of the second detection electrode.

$$0.5 \ \mu m \leq Wb < Wa \leq 10 \ \mu m \qquad (1)$$

$$Wa - Wb \leq 4.0 \ \mu m \qquad (2)$$

According to a third aspect of the present invention, there is provided a touch panel using the sheet-like conductor according to the first or second aspect.

According to the present invention, it is possible to improve the visibility of a sheet-like conductor due to a mesh-like electrode formed of thin metal wires without deteriorating the transmittance of the sheet-like conductor.

In addition, according to the present invention, it is possible to improve the visibility of a display screen of a touch panel without deteriorating the transmittance of the sheet-like conductor.

DESCRIPTION OF THE PREFERRED EMBODIMENTS

Hereinafter, a sheet-like conductor according to the present invention will be described in detail based on preferable embodiments shown in the attached drawings.

In the following description, a conductive film for a touch panel will be described as a representative example of the sheet-like conductor according to the present invention. However, the present invention is not limited to this example. The sheet-like conductor may be of any type as long as the sheet-like conductor has electrodes arranged on both surfaces of a substrate formed of an insulator. For example, it is needless to say that the sheet-like conductor may be, for example, a sheet-like conductor to be placed on display screens of various display devices or a sheet-like conductor for electromagnetic shielding or the like. In the present specification, a numerical range expressed using "to" means a range including numerical values before and after "to" as a lower limit and an upper limit, respectively.

(First Embodiment)

Figure 1:
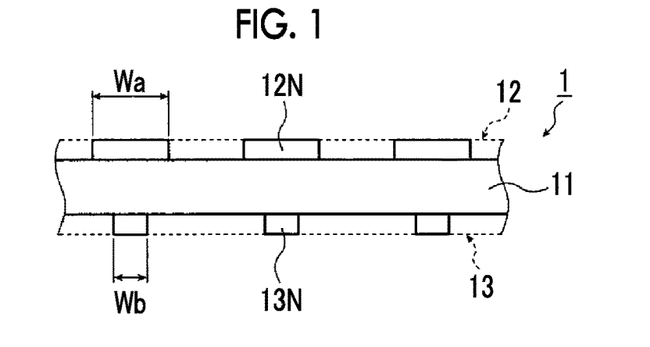
FIG. 1 is a partial cross-sectional view schematically showing a part of a detection area of a sheet-like conductor according to a first embodiment of the present invention.

FIG. 1 is a partial cross-sectional view schematically showing a part of a detection area of a sheet-like conductor according to a first embodiment of the present invention.

A sheet-like conductor 1 shown in FIG. 1 includes an insulating substrate 11 (hereinafter, also simply referred to as "substrate"), a first detection electrode 12 that is arranged on a viewing side, and a second detection electrode 13 on the opposite side to the viewing side. In the case of constituting a touch panel display using the sheet-like conductor 1, the first detection electrode 12 is arranged on the side close to an operator who observes the display screen of the display and the second detection electrode 13 is arranged on the display screen of the display.

The substrate 11 constitutes the insulator of the present invention. The substrate supports the first detection electrode 12 arranged on one surface in a layered manner and also supports the second detection electrode 13 arranged on the other surface in a layered manner.

It is preferable that the substrate 11 allows light to pass through the substrate appropriately. Specifically, it is preferable that the substrate has a total light transmittance of 85% to 100%.

In addition, the substrate 11 has electrical insulation and the first detection electrode 12 and the second detection electrode 13 are electrically insulated.

The substrate 11 is preferable a transparent insulating substrate, and for example, a transparent insulating resin substrate, a transparent ceramic substrate, a glass substrate and the like may be used. Among these, in terms of excellent toughness, a transparent insulating resin substrate is preferable.

More specific examples of the material for constituting the transparent insulating resin substrate include polyethylene terephthalate, polyethersulfone, a polyacrylic resin, a polyurethane resin, polyester, polycarbonate, polysulfone, polyamide, polyarylate, polyolefin, a cellulose resin, polyvinyl chloride, and a cycloolefin resin. Among these, in terms of excellent transparency, polyethylene terephthalate, a cycloolefin resin, polycarbonate, and a triacetylcellulose resin are preferable.

The substrate 11 may be composed of a single layer or a multilayer of two or more layers. The thickness of the substrate 11 is not particularly limited and is preferably 5 to 350 μm and more preferably 30 to 150 μm. When the thickness is within the above range, a desired transmittance of visible light is obtained and handling is easy.

In addition, the shape of the substrate 11 in a plan view may be, for example, a rectangular shape or may be, for example, a circular shape or a polygonal shape.

The first detection electrode 12 and the second detection electrode 13 are respectively arranged on one surface (on a viewing side) of the substrate 11 (an upper surface in the drawing) and the other surface (on the opposite side to the viewing side) thereof (a lower surface in the drawing) in a layered manner. The first detection electrode 12 is formed of thin metal wires 12N and the second detection electrode 13 is formed of thin metal wires 13N.

The line width Wa of the thin metal wire 12N is determined so as to satisfy the following expression (1 a) from the viewpoint of relatively easily forming an electrode having low resistance (from the viewpoint of conductivity) and visibility.

$$0.5 \ \mu m < Wa \leq 10.0 \ \mu m \tag{1a}$$

In addition, the line width Wb of the thin metal wire 13N is determined so as to satisfy the following expression (1b) from the viewpoint of conductivity and visibility similar to the thin metal wire 12N.

$$0.5 \ \mu m \leq Wb < 10.0 \ \mu m \tag{1b}$$

Herein, each the line width Wa and Wb refers to a line width (an average value of 10 places) obtained in the case in which sheet-like conductor samples are cut from the surface of each thin metal wire perpendicular to an extending direction, and the horizontal width of the cross section of each thin wire (the maximum width in a direction horizontal to the substrate) is observed and measured with an electron microscope.

In addition, the line width Wa of the thin metal wire 12N and the line width Wb of the thin metal wire 13N are determined so as to satisfy the relationship of the following expression (1c) from the viewpoint of visibility. That is, it is necessary that the line width Wa is made larger than the line width Wb.

$$Wb < Wa \tag{1c}$$

In contrast to the above expression (1c), in the case in which the line width. Wb is made equal to or larger than the line width Wa, that is, in the case in which the line widths are determined so as to satisfy the following expression (1d), similar to the case in which the line widths are determined so as to satisfy the expression (1 c), the effect of improving the visibility of the sheet-like conductor due to a mesh-like electrode formed of thin metal wires cannot be obtained.

$$Wa \leq Wb \tag{1d}$$

Summarizing these expressions (1a) to (1c), it is necessary that the line width Wa of the thin metal wire 12N and the line width Wb of the thin metal wire 13N satisfy the following expression (1).

$$0.5 \ \mu m \leq Wb < Wa \leq 10.0 \ \mu m \tag{1}$$

In addition, it is necessary that the difference between the line width Wa of the thin metal wire 12N and the line width Wb of the thin metal wire 13N satisfies the following expression (2).

$$Wa - Wb \leq 4.0 \ \mu m \tag{2}$$

The reason for limiting the line width Wa of the thin metal wire 12N and the line width Wb of the thin metal wire 13N to the above range of the expression (1) is that when the line widths Wa and Wb are less than 0.5 μm, the thin metal wires 12N and 13N are too thin and thus there is a concern of deterioration in conductivity or disconnection. On the other hand, when the line widths Wa and Wb exceed 10.0 μm, the thin metal wires 12N and 13N are too thick, and thus there is a concern of deterioration in visibility, and the thin metal wires 12N and 13N being visually recognized in a display screen of a display, particularly, in a black display screen when the powder of the display is off. In addition, in the case in which the line width Wa of the thin metal wire 12N is equal to or smaller than the line width Wb of the thin metal wire 13N, that is, when the above expression (1 d) is satisfied, the thin metal wire 13N becomes noticeable since the line width seems larger than the actual line width.

Further, the reason for limiting the difference between the line width Wa and the line width Wb to the above range of the expression (2) is that when the difference is out of the above range and is greater than 4.0 μm, contrarily, the thin metal wire 12N becomes noticeable and the effect of improving visibility cannot be obtained.

In the sheet-like conductor, when the above expressions (1) and (2) are satisfied, it is possible to obtain the effect of improving visibility without deteriorating the transmittance.

In the present invention, it is more preferable that the following expression (3) is further satisfied.

$$0.5 \ \mu m \leq Wa - Wb \leq 2.0 \ \mu m \tag{3}$$

When the difference is within the range of the above expression (3), it is possible to further improve visibility.

In addition, in the embodiment, it is necessary that that the line width Wa of the thin metal wire 12N and the line width Wb of the thin metal wire 13N satisfy the above expression (1). However, from the viewpoint of conductivity, easy manufacturing, and visibility, it is preferable that the line widths satisfy the following expression (4). When the line widths satisfy the following expression (4) and further satisfy the above expression (3), it is possible to further improve the visibility of the sheet-like conductor.

$$1.0 \ \mu m \leq Wb < Wa \leq 6.0 \ \mu m \tag{4}$$

The thickness of the thin metal wires 12N and 13N is not particularly limited and from the viewpoint of conductivity and visibility, the thickness can be selected from a range of 0.00001 mm (0.01 μm) to 0.2 mm and is preferably 30 μm or less, more preferably 20 μm or less, still more preferably 0.01 to 9 μm, and most preferably 0.05 to 5 μm.

Examples of the material for the thin metal wires 12N and 13N include metals such as gold (Au), silver (Ag), copper (Cu), and aluminum (Al), and alloys, and metal oxides such as tin oxide, zinc oxide, cadmium oxide, gallium oxide, and titanium oxide. Among these, in terms of excellent conductivity of the thin metal wires 12N and 13N, silver is preferable.

In the first detection electrode 12 and the second detection electrode 13 of the sheet-like conductor, the thin metal wires 12N and 13N thereof may be formed of metal oxide particles, and a metal paste such as a silver paste or a copper paste. From the viewpoint of conductivity and transparency, among the above materials, the thin metal wires 12N and 13N is preferably formed of a thin silver wire formed by exposing and developing silver halide. Accordingly, the first detection electrode 12 and the second detection electrode 13 are preferably formed of a conductive film using thin silver wires.

It is preferable the thin metal wires 12N and 13N include a binder from the viewpoint of adhesiveness between the thin metal wires 12N and 13N and the substrate 11.

From the viewpoint of achieving further excellent adhesiveness between the thin metal wires 12N and 13N and the substrate 11, a water soluble polymer is preferably used as such binder. Examples of the type of the binder include gelatin, carrageenan, polyvinyl alcohol (PVA), polyvinyl pyrrolidone (PVP), polysaccharides such as starch, cellulose and derivatives thereof, polyethylene oxide, polyvinyl amine, chitosan, polylysine, polyacrylic acid, polyalginic acid, polyhyaluronic acid, carboxycellulose, gum arabic, and sodium alginate. Among these, gelatin is preferably used in term of further excellent adhesiveness between the thin metal wires 12N and 13N and the substrate 11.

As the gelatin, in addition to a lime-treated gelatin, an acid-treated gelatin may be used. Also, a hydrolyzed gelatin, an enzymatically decomposed gelatin, or a gelatin modified by another amino or a carboxyl group (such as a phthalated gelatin or an acetylated gelatin) may be used.

In addition, as the binder, polymers different from the above gelatin (hereinafter, also simply referred to as "polymers") may be used together with the gelatin.

The type of the polymers to be used is not particularly limited as long as the type is different from the gelatin. Examples thereof include at least any one selected from the group consisting of acrylic resins, styrene resins, vinyl resins, polyolefin resins, polyester resins, polyurethane resins, polyamide resins, polycarbonate resins, polydiene resins, epoxy resins, silicone resins, cellulose polymers and chitosan polymers, and copolymers of monomers constituting these resins.

The volume ratio between the metal and the binder (volume of metal/volume of binder) in the thin metal wires 12N and 13N is preferably 1.0 or more and more preferably 1.5 or more. When the volume ratio between the metal and the binder is set to 1.0 or more, the conductivity of the thin metal wires 12N and 13N can be further improved. Although the upper limit thereof is not particularly limited, from the viewpoint of productivity, the upper limit is preferably 6.0 or less, more preferably 4.0 or less, and still more preferably 2.5 or less.

The volume ratio between the metal and the binder can be calculated from the density of the metal and the binder included in the thin metal wires 12N and 13N. For example, the volume ratio between the metal and the binder can be obtained by calculation while setting, in the case in which the metal is silver, the density of silver to 10.5 g/cm$^3$ and in the case in which the binder is gelatin, the density of gelatin to 1.34 g/cm$^3$.

Although not shown, as described below, protective covers which respectively protect the first and the second detection electrodes 12 and 13 may be provided on the respective outer sides of the first and the second detection electrodes 12 and 13 of the sheet-like conductor shown in FIG. 1 (the upper surface and the lower surface in the drawing).

Next, the mesh structure of the first and second detection electrodes of the sheet-like conductor of the present invention will be described.

Figure 2A:
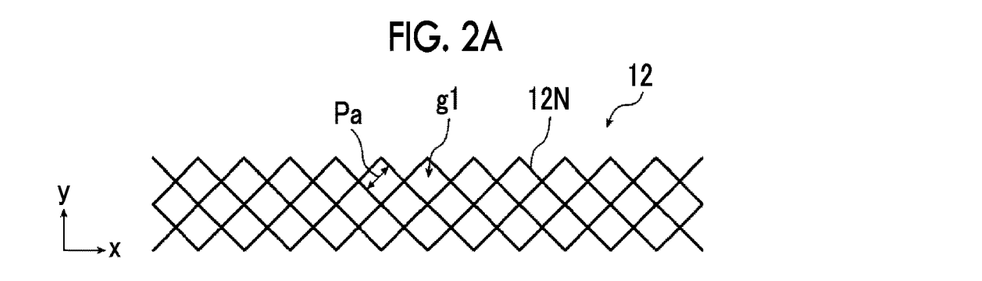
FIG. 2A is an enlarged plan view schematically showing a part of a first detection electrode of the sheet-like conductor in FIG. 1
Figure 2B:
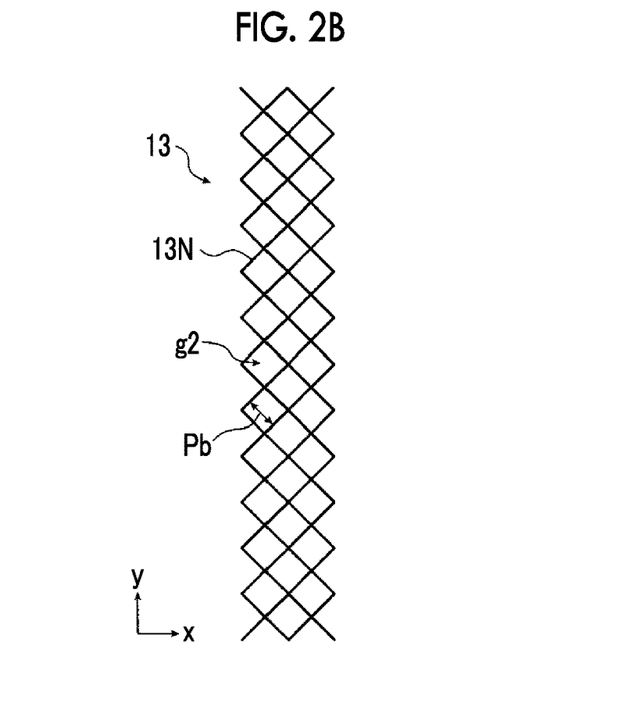
FIG. 2B is an enlarged plan view schematically showing a part of a second detection electrode of the sheet-like conductor in FIG. 1.

FIG. 2A is an enlarged plan view showing a part of the first detection electrode 12 and FIG. 2B is an enlarged plan view showing a part of the second detection electrode 13.

As shown in FIG. 2A, the first detection electrode 12 is a mesh-like conductive wire extending in an x direction, is composed of the thin metal wires 12N, and includes plural lattices g1 of the crossing thin metal wires 12N.

In addition, as shown in FIG. 2B, the second detection electrode 13 is a mesh-like conductive wire extending in a y direction, is composed of the thin metal wires 13N, and includes plural lattices g2 of the crossing thin metal wires 13N, similar to the above-described thin metal wires 12N.

The lattice g1 includes an opening area surrounded by the thin metal wires 12N. The inter-wire pitch Pa between the thin metal wires 12N of the mesh structure of the first detection electrode 12 is set to be appropriate from the viewpoint of conductivity and visibility, and is preferably 500 µm or less and 100 µm or more.

In the same manner, the lattice g2 includes an opening area surrounded by the thin metal wires 13N. The inter-wire pitch Pb between the thin metal wires 13N of the mesh structure of the second detection electrode 13 is set to be appropriate from the viewpoint of conductivity and visibility, and is preferably 500 µm or less and 100 µm or more.

Here, a preferable reason for limiting the inter-wire pitch Pa between the thin metal wires 12N and the inter-wire pitch Pb between the thin metal wires 13N to 100 µm to 500 µm is that by setting the inter-wire pitches Pa and Pb to be within the above range, a required transmittance can be realized while achieving a good balance between conductivity and visibility.

In the first detection electrode 12 and the second detection electrode 13, the opening ratio is preferably 85% or more, more preferably 90% or more, and most preferably 95% or more from the viewpoint of a visible light transmittance, for example, a transmittance in a wavelength range of 380 nm to 780 nm. The opening ratio corresponds to an area of the opening areas (light-transmitting portions) excluding the thin metal wires 12N and 13N in a predetermined area in the first detection electrode 12 or the second detection electrode 13 with respect to the total area.

The lattices g1 and g2 have a substantially square shape in the shown examples. In the present invention, the shape is not limited thereto and other polygonal shapes (for example, a triangular shape, a quadrangular shape, a hexagonal shape, a rhombic shape, and a random polygonal shape) may be adopted. In addition, the shape of one side may be a linear shape, curved shape, or a circular arc shape. In the case of a circular arc shape, for example, two facing sides may be formed into a circular arc shape projecting outwardly and other two facing sides may be formed into a circular arc shape projecting inwardly. Furthermore, the shape of each side may be a wavy shape formed by continuously arranging an outwardly projecting circular arc and an inwardly projecting circular arc. It is needless to say that the shape of each side may be a sine curve or a cosine curve. In the case in which the shape of the lattice is a regular polygon, the length of the side is set to a pitch. In the case in which the shape of the lattice is not a regular polygon, a distance between the centers of adjacent lattices is set to a pitch. In the case of a random lattice shape, the pitches of 30 lattices are measured to obtain an average value thereof and the obtained average value is set to a pitch.

In the examples shown in FIGS. 2A and 2B, the electrode width of the first detection electrode 12 shown in FIG. 2A is equal to the electrode width of the second detection electrode 13 shown in FIG. 2B. However, the present invention is not limited thereto. In another embodiment of the present invention, the electrode width of the first detection electrode 12 may be smaller than the electrode width of the second detection electrode 13. Here, the electrode width is defined as a gap (width) between envelopes on both sides of mesh-like conductive wires extending in a first direction in a perpendicular direction thereof along the first direction. That is, the electrode width of the first detection electrode 12 is defined as a gap (width) between envelopes of both sides of mesh-like conductive wires extending in the x direction in the y direction, and the electrode width of the second detection electrode 13 is defined as a gap (width) between envelopes of both sides of mesh-like conductive wires extending in the y direction in the x direction.

As described above, the reason for making the electrode width of the first detection electrode 12 smaller than the electrode width of the second detection electrode 13 is that an area in which the electric field from the second detection electrode 13 is shielded by the first detection electrode 12 is reduced and the amount of change in electrostatic capacitance when a touch with a finger or the like is made increases, that is, a S/N ratio is improved. In this case, the electrode having a small electrode width becomes an electrode close to an observer, and the electrode having a large width is arranged on the side close to a display device. Accordingly, the effect of the present invention can be obtained by making the line width of the thin metal wire constituting the electrode having a large electrode width smaller than the line width of the thin metal wires constituting the electrode having a small electrode width.

(Electrostatic Capacitive Type Touch Panel Sensor)

Figure 3:
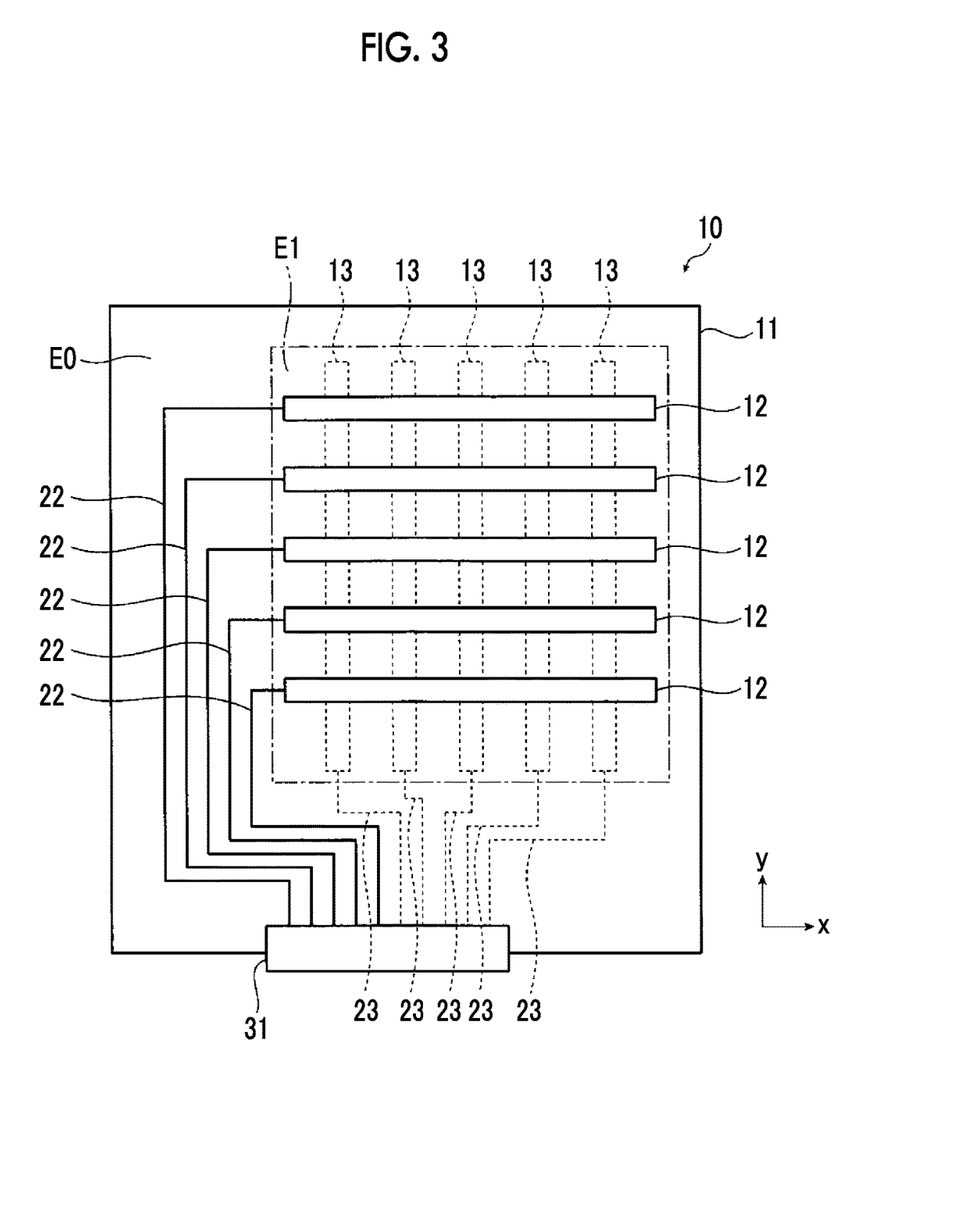
FIG. 3 is a plan view schematically showing the overall configuration of the sheet-like conductor including the detection area in FIG. 1.

FIG. 3 is a plan view showing an overall configuration of an electrostatic capacitive type touch panel sensor 10 including a detection area composed of the above-described sheet-like conductor 1.

The electrostatic capacitive type touch panel sensor 10 shown in FIG. 3 is arranged on the display screen of a display device (not shown) (on the side close to an operator), and is a sensor for detecting a position of an external conductor such as a human finger by utilizing a change in electrostatic capacitance that occurs when the external conductor such as a human finger touches or approaches the detection electrode.

The configuration of the electrostatic capacitive type touch panel sensor 10 is not particularly limited. The electrostatic capacitive type touch panel sensor typically has detection electrodes (particularly, a detection electrode extending in the x direction and a detection electrode extending in the y direction), and specifies the coordinate of a finger by detecting a change in electrostatic capacitance of the detection electrode touched with the finger or close to the finger.

The electrostatic capacitive type touch panel sensor is composed of a detection area E1 and an outer side area E0. The detection area E1 is an area in which an input operation can be carried out by a user (an input area in which a touch with an object can be detected (a sensing portion)), and a first lead-out wiring 22, a second lead-out wiring 23, and a flexible printed wiring board 31 are arranged in the outer side area E0 positioned on the outer side of the detection area E1.

The detection area E1 is composed of the substrate 11, the first detection electrode 12, and the second detection electrode 13 described using FIGS. 1, 2A, and 2B. The first detection electrode 12 is arranged on the surface of the substrate 11 on the viewing side, and the second detection electrode 13 is arranged on the surface of the substrate 11 on the opposite side to the viewing side, that is, on the opposite surface to the surface on which the first detection electrode is formed. The plural first detection electrodes 12 extending in the x direction and the plural second detection electrodes 13 extending in the y direction cross one another with the substrate 11 interposed therebetween.

The first detection electrode 12 and the second detection electrode 13 are sensing electrodes for sensing a change in electrostatic capacitance and constituting a sensing portion (sensor portion). That is, when the detection area E1 is touched with a finger tip, a mutual electrostatic capacitance between the first detection electrode 12 and the second detection electrode 13 changes and the position of the finger tip is calculated by an IC circuit based on the amount of change. The first detection electrode 12 has a role of detecting an input position of a finger of a use approaching the detection area E1 in the x direction and has a function of generating electrostatic capacitance between the finger and the detection area. The first detection electrodes 12 are electrodes that extend in the first direction (x direction), are arranged with predetermined intervals in the second direction (y direction) perpendicular to the first direction, and have a predetermined mesh-like pattern shown in FIG. 2A.

The second detection electrode 13 has a role of detecting an input position of a finger of a use approaching the detection area E1 in the y direction and has a function of generating electrostatic capacitance between the finger and the detection area. The second detection electrodes 13 are electrodes that extend in the second direction (y direction), are arranged with predetermined intervals in the first direction (x direction), and have a predetermined mesh-like pattern shown in FIG. 2B. In FIG. 3, five first detection electrodes 12 and five second detection electrodes 13 are provided but the number thereof is not particularly limited.

The outer side area E0 is composed of the substrate 11 continuously extending from the detection area E1, the first lead-out wiring 22 arranged on the substrate 11, the second lead-out wiring 23, and the flexible printed wiring board 31.

The first lead-out wiring 22 and the second lead-out wiring 23 are members for applying a voltage to the first detection electrode 12 and the second detection electrode 13, respectively.

One end of the first lead-out wiring 22 is electrically connected to the corresponding first detection electrode 12 and the other end thereof is electrically connected to the flexible printed wiring board 31.

One end of the second lead-out wiring 23 is electrically connected to the corresponding second detection electrode 13 and the other end thereof is electrically connected to the flexible printed wiring board 31.

In FIG. 3, five first lead-out wirings 22 and five second lead-out wirings 23 are arranged but the number thereof is not particularly limited. The lead-out wirings are typically arranged according to the number of detection electrodes.

Examples of the material for constituting the first lead-out wiring 22 and the second lead-out wiring 23 include metals such as gold (Au), silver (Ag), and copper (Cu), and metal oxides such as tin oxide, zinc oxide, cadmium oxide, gallium oxide, and titanium oxide. Among these, in terms of excellent conductivity, silver is preferable. In addition, the lead-out wirings may be composed of metal pastes such as a silver paste and a copper paste, thin films of metals such as aluminum (Al) and molybdenum (Mo), and alloys. In the case of using a metal paste, screen printing or an ink jet printing method is suitably used, and in the case of using a thin film of a metal or an alloy film, a method of patterning a sputter film by a photolithography method and the like are suitably used.

From the viewpoint of further excellent adhesiveness with the substrate 11, it is preferable that the first lead-out wiring 22 and the second lead-out wiring 23 include a binder. The type of the binder is as described above.

The flexible printed wiring board 31 is a broad in which plural wirings and terminals are provided on the substrate and is connected to the respective other ends of the first lead-out wirings 22 and the respective other ends of the second lead-out wirings 23 to connect the electrostatic capacitive type touch panel sensor 10 and an external device (for example, a display device).

(Touch Panel Display)

The touch panel display is configured by arranging the detection area E1 of the above-described electrostatic capacitive type touch panel sensor 10 on the display screen of a display device (not shown), and further covering the surfaces thereof with protective covers. In addition, for adhesion between the electrostatic capacitive type touch panel sensor 10 and the display device and adhesion between the electrostatic capacitive type touch panel and the protective covers, a transparent adhesive sheet may be used.

The use confirms an image for input operation and the like displayed on the display screen of the touch panel display and touches a touch surface corresponding to the image for input operation and the like to carry out various input operations through the touch panel sensor.

(Protective Cover)

The protective cover is a substrate which is arranged on an adhesive sheet and plays a role of protecting the electrostatic capacitive type touch panel sensor from the external environment, and the principal surface thereof constitutes the touch surface.

As the protective cover, a transparent substrate is preferable and a plastic film, a plastic plate, a glass plate, and the like may be used. It is desirable that the thickness of the substrate is appropriately selected according to respective purposes.

As the materials for the plastic film and the plastic plate, for example, polyesters such as polyethylene terephthalate (PET), and polyethylenenaphthalate (PEN); polyolefins such as polyethylene (PE), polypropylene (PP), polystyrene, and ethylene-vinyl acetate copolymers (EVA); polyvinyl resins; in addition to polycarbonate (PC), polyamide, polyimide, acrylic resin, triacetyl cellulose (TAC), and cycloolefin resin (COP) may be used.

In addition, as the protective cover, a polarizing plate, a circularly polarizing plate, and the like may be used.

(Display Device)

Although not shown, the display device is a device having a display screen for displaying an image and each member is arranged on the side close to the display screen.

The type of the display device is not particularly limited and known display devices may be used. Examples thereof include a cathode ray tube (CRT) display device, a liquid crystal display device (LCD), an organic light emitting diode (OLED) display device, a vacuum fluorescent display (VFD) a plasma display panel (PDP), an electric field display (SED), a field emission display (FED), and an electronic paper (E-Paper).

(Method of Manufacturing Sheet-Like Conductor)

The method of manufacturing the sheet-like conductor is not particularly limited and a known method may be used. In addition, the sheet-like conductor can be formed as an integrated body including not only the detection area E1 having the detection electrodes but also the outer side area E0 having the lead-out wirings. For example, a method of exposing and developing photoresist films on metal foils formed on the both principal surfaces of the substrate 11 to form a resist pattern, and etching the metal foils exposed from the resist pattern may be used. In addition, a method of printing a paste including metal particles or metal nanowires on the both principal surfaces of the substrate 11, sintering the paste, and then plating the paste with a metal may be used. In addition, a method of carrying out printing on the substrate 11 by a screen printing board or a gravure printing plate, or a method of carrying out printing by an ink jet method may be used.

Further, in addition to the above methods, a method of using silver halide may be used. More specifically, a method including a process (1) of forming a silver halide emulsion layer containing silver halide and a binder (hereinafter, simply referred to as "photosensitive layer") on both surfaces of the substrate 11 respectively, and a process (2) of exposing the photosensitive layer and then developing the photosensitive layer may be used.

Hereinafter, each process will be described.

[Process (1): Photosensitive Layer Forming Process]

The process (1) is a process of forming a photosensitive layer containing silver halide and a binder on the both surfaces of the substrate 11.

The method of forming the photosensitive layer is not particularly limited and from the viewpoint of productivity, a method of contacting a photosensitive layer forming composition containing silver halide and a binder with the substrate 11 and forming a photosensitive layer on the both surfaces of the substrate 11 is preferable.

Hereinafter, the form of the photosensitive layer forming composition used. in the above method will be described in detail and then the order of the processes will be described in detail.

The photosensitive layer forming composition contains silver halide and a binder.

The halogen element to be contained in the silver halide may be any of chlorine, bromine, iodine and fluorine and may be a mixture thereof. As the silver halide, for example, silver halides mainly including silver chloride, silver bromide, and silver iodide are preferably used and silver halides mainly including silver bromide and silver chloride are more preferably used.

The type of the binder to be used is as described above. In addition, the binder may be included in the photosensitive layer forming composition in the form of latex.

The volume ratio between the silver halide and the binder included in the photosensitive layer forming composition is not particularly limited and is appropriately adjusted such that the volume ratio between the metal and the binder in the above-described thin metal wires 12N and 13N falls within an appropriate range.

A solvent is contained in the photosensitive layer forming composition as required.

Examples of the solvent to be used include water, organic solvents (for example, alcohols such as methanol; ketones such as acetone; amides such as formamide; sulfoxides such as dimethylsulfoxide; esters such as ethyl acetate; and ethers), ionic liquids, and mixed solvents thereof.

The content of the solvent to be used is not particularly limited and is preferably within a range of 30% by mass to 90% by mass and more preferably within a range of 50% by mass to 80% by mass with respect to the total mass of the silver halide and binder.

(Order of Process)

The method of allowing the photosensitive layer forming composition to contact with the substrate 11 is not particularly limited and a known method may be adopted. For example, a method of applying the photosensitive layer forming composition to the substrate 11, a method of immersing the substrate 11 in the photosensitive layer forming composition, or the like may be used.

The content of the binder in the photosensitive layer to be formed is not particularly limited and is preferably 0.3 g/m$^2$ to 5.0 g/m$^2$ and more preferably 0.5 g/m$^2$ to 2.0 g/m$^2$.

In addition, the content of the silver halide in the photosensitive layer is not particularly limited and from the viewpoint of conductive properties of the thin metal wires 12N and 13N, is preferably 1.0 g/m$^2$ to 20.0 g/m$^2$ and more preferably 5.0 g/m$^2$ to 15.0 g/m$^2$ in terms of silver.

As required, a protective layer formed of a binder may be further provided on the photosensitive layer. By providing the protective layer, scratch prevention and optical properties are enhanced.

[Process (2): Exposure and Development Process]

The process (2) is a process of forming the mesh-like first detection electrode 12 formed of the thin metal wires 12N and the first lead-out wiring 22, and the mesh-like second detection electrode 13 formed of the thin metal wires 13N and the second lead-out wiring 23 by pattern-wise exposing the photosensitive layer obtained in the above process (1) and then developing the layer.

First, a pattern exposure treatment will be described in detail, and then a development treatment will be described in detail below.

(Pattern Exposure)

The photosensitive layer is subjected to pattern-wise exposure and the silver halide in the photosensitive layer forms a latent image in an exposed area. In the area in which the latent image is formed, thin metal wires formed in a mesh shape are formed by the development treatment which will be described later. On the other hand, in an unexposed area which is not subjected to exposure, silver halide dissolves during a fixing treatment, which will be described later, and flows out from the photosensitive layer to obtain a transparent film. Thus, an opening area which becomes a light transmission part is formed.

A light source to be used during the exposure is not particularly limited and examples thereof include light such as visible light and UV rays and radiation such as X rays.

The method of carrying out pattern exposure is not particularly limited and for example, surface exposure using a photo mask or scanning exposure using a laser beam may be carried out. The shape of the pattern is not particularly limited and is appropriately adjusted according to the pattern of the thin metal wire to be formed.

(Development Treatment)

The method of the development treatment is not particularly limited and a known method may be adopted. For example, ordinary development treatment techniques employed for silver salt photographic films, photographic printing papers, films for making a printing plate and an emulsion mask for a photo mask may be used.

The type of the developing solution used during the development treatment is not particularly limited and for example, a PQ developing solution, an MQ developing solution, an MAA developing solution, and the like may be used. Examples of commercially available products include developing solutions used in processes of FUJIFILM Corporation such as CN-16, CR-56, CP45X, FD-3, and PAPITOL, and processes of KODAK such as C-41, E-6, RA-4, D-19, and D-72, and developing solutions contained in the kits thereof. In addition, lithographic developing solutions may be used.

The development treatment may include a fixing treatment to be carried out for the purpose of removing the silver salt in unexposed portions to stabilize. In the fixing treatment, fixing treatment techniques which are used for silver salt photographic films, photographic printing papers, films for making a printing plate and an emulsion mask for a photo mask may be used.

The fixing temperature in the fixing treatment is preferably 20° C. to 50° C. and more preferably 25° C. to 45° C. In addition, the fixing time is preferably 5 seconds to 1 minute and more preferably 7 seconds to 50 seconds.

The mass of metal silver included in the exposed portion (thin metal wires) after the development treatment is preferably 50% by mass or more and more preferably 80% by mass or more with respect to the mass of silver included in the exposed portion before exposure. When the mass of silver included in the exposed portion is 50% by mass or more with respect to the mass of silver included in the exposed portion before exposure, high conductivity can be obtained and thus this case is preferable.

In addition to the above process, as required, the following undercoat forming process, antihalation layer forming process, or heating treatment may be carried out.

(Undercoat Forming Process)

In terms of excellent adhesiveness between the substrate 11 and the silver halide emulsion layer, it is preferable to carry out a process of forming an undercoat including the binder on the both surfaces of the substrate 11 before the process (1) above.

The binder to be used is as described above. The thickness of the undercoat is not particularly limited and from the viewpoint of suppressing a change rate in adhesiveness and mutual electrostatic capacitance, the thickness is preferably 0.01 μm to 0.5 μm and more preferably 0.01 μm to 0.1 μm.

(Antihalation Layer Forming Process)

From the viewpoint of thinning of the thin metal wires 12N and 13N, it is preferable to carry out a process of forming an antihalation layer on the undercoat.

(Process (3): Heating Process)

A process (3) is a process of carrying out a heating treatment after the development treatment. By carrying out the process, fusion between the binder particles occurs and the hardness of the thin metal wires 12N and 13N is further increased. Particularly, in the case in which polymer particles are dispersed in the photosensitive layer forming composition as the binder (in the case in which the binder is polymer particles in latex), by carrying out the process, fusion between the polymer particles occurs and the thin metal wires 12N and 13N exhibiting a desired hardness are formed.

The condition for the heating treatment is appropriately selected according to the binder to be used and from the viewpoint of a film formation temperature of the polymer particles, the temperature is preferably 40° C. or higher, more preferably 50° C. or higher, and still more preferably 60° C. or higher. In addition, from the viewpoint of suppressing curling of the substrate or the like, the temperature is preferably 150° C. or lower and more preferably 100° C. or lower.

The heating time is not particularly limited and from the viewpoint of curling of the substrate or the like and productivity, the heating time is preferably 1 minute to 5 minutes and more preferably 1 minute to 3 minutes.

The heating treatment typically serves as a drying process that is carried out after the exposure and development treatment. Thus, a new process for film formation of the polymer particles is not required to be added and the heating treatment is excellent from the viewpoint of productivity and costs.

By carrying out the above process, light-transmitting portions including the binder are formed in the opening area between the thin metal wires 12N and the opening area between the thin metal wires 13N. The transmittance of the light-transmitting portions is a transmittance in a wavelength range of 380 nm to 780 nm, that is, a transmittance indicated by the minimum value of the visible light transmittance and is preferably 90% or more, more preferably 95% or more, still more preferably 97% or more, particularly preferably 98% or more, and most preferably 99% or more.

In addition, in the above-described method of manufacturing the sheet-like conductor, the first detection electrode 12 and the first lead-out wiring 22 are formed on one surface of the substrate 11 and the second detection electrode 13 and the second lead-out wiring 23 are formed on the other surface thereof. It is not required to form these detection electrodes and lead-out wirings on the both surfaces of the substrate and these detection electrodes and lead-out wirings may be formed only one of the surfaces of the substrate.

The sheet-like conductor according to the first embodiment of the present invention and the touch panel basically has the above configuration.

(Second Embodiment)

The embodiment of the sheet-like conductor of the present invention is not limited to the above embodiment of the FIG. 1 and may adopt other embodiments. For example, the sheet-like conductor having the embodiment shown in FIG. 4 may be adopted.

Figure 4:
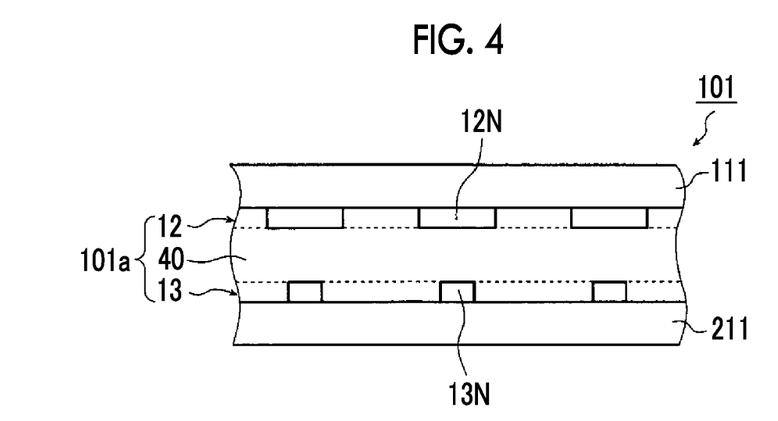
FIG. 4 is a schematic partial cross-sectional view schematically showing a part of a detection area of a sheet-like conductor according to a second embodiment of the present invention.

FIG. 4 is a schematic partial cross-sectional view schematically showing a part of a detection area of a sheet-like conductor according to a second embodiment of the present invention.

As shown in FIG. 4, a sheet-like conductor 101 according to the second embodiment includes a first substrate 111, a second substrate 211, a first detection electrode 12 interposed between substrates 111 and 211 thereof and arranged on the first substrate 111, an adhesive sheet 40, and a second detection electrode 13 arranged on the second substrate 211. In the sheet-like conductor 101, the first detection electrode 12 and the second detection electrode 13 are bonded by the adhesive sheet 40.

The description of the second embodiment shown in FIG. 4 is confined to the description of the configuration of the detection area E1 in FIG. 3 for the sake of ease, and the description regarding the first lead-out wiring, the second lead-out wiring, and the flexible printed wiring board of the outer side area E0 will be omitted.

As shown in FIG. 4, the sheet-like conductor 101 is formed by causing the first detection electrode 12 formed on the first substrate 111 and the second detection electrode 13 formed on the second substrate 211 to face each other and bonding the substrates by the adhesive sheet 40. The sheet-like conductor 101 has the same configuration as that of the sheet-like conductor 1 in FIG. 1 except that the first substrate 111 and the second substrate 211, and the adhesive sheet 40 arranged between the first detection electrode 12 and the second detection electrode 13 are used. The same reference numerals are assigned to the same components and the descriptions thereof will be omitted. In addition, the first detection electrode 12 and the second detection electrode 13 are respectively formed on the first substrate 111 and the second substrate 211 by the same method as the above-described method of manufacturing the sheet-like conductor.

The first substrate 111 and the second substrate 211 have the same configuration as that of the above-described substrate 11 and thus the description thereof will be omitted herein. In the embodiment, the substrates are arranged on both outer sides of the sheet-like conductor 101 (on the upper surface and the lower surface in the drawing) and thus functions as the above-described protective covers. Further, the first substrate 111 and the second substrate 211 may be peeled off from the sheet-like conductor 101 by providing peelability between the first detection electrode 12 and the first substrate 111, and between the second detection electrode 13 and the second substrate 211. In this manner, a sheet-like conductor unit 101a composed of the first detection electrode 12, the second detection electrode 13, and the adhesive sheet 40 can be formed and used.

The adhesive sheet 40 constitutes the insulator of the present invention and similar to the substrate 11 shown in FIG. 1, has electrical insulation and is a layer for electrically insulating the first detection electrode 12 and the second detection electrode 13 from each other and causing the first detection electrode 12 and the second detection electrode 13 to adhere to the both surfaces thereof. It is preferable that the adhesive sheet is optically transparent, that is, is a transparent insulating adhesive sheet. As the material for constituting the adhesive sheet 40, known materials are used. In addition, since the adhesive sheet 40 functions as the substrate 11, it is preferable that the adhesive sheet has the same performance as the performance of the substrate 11.

In the sheet-like conductor 101 shown in FIG. 4, plural first detection electrodes 12 and second detection electrodes 13 are used respectively as shown in FIG. 3 and the both detection electrodes are arranged so as to perpendicular to each other as shown in FIG. 3.

(Third Embodiment)

Figure 5:
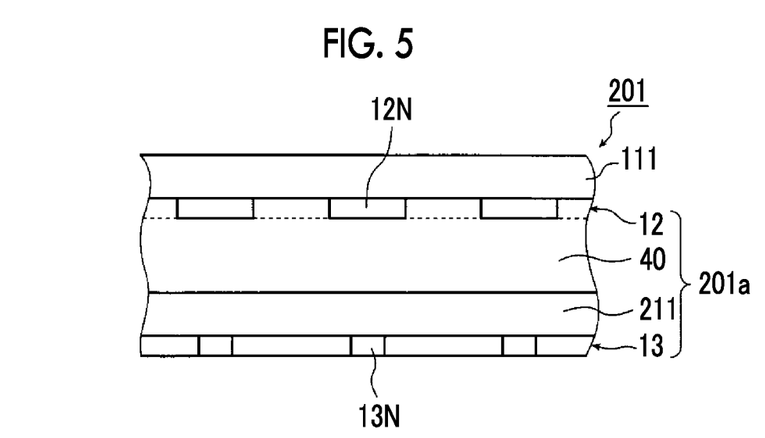
FIG. 5 is a partial cross-sectional view schematically showing a part of a detection area of a sheet-like conductor according to a third embodiment of the present invention.

An embodiment shown in FIG. 5 may be adopted as another embodiment of the sheet-like conductor.

FIG. 5 is a partial cross-sectional view schematically showing a part of a detection area of a sheet-like conductor according to a third embodiment of the present invention.

As shown in FIG. 5, a sheet-like conductor 201 according to a third embodiment includes a first substrate 111, a first detection electrode 12 arranged on the first substrate 111, an adhesive sheet 40, a second substrate 211, and a second detection electrode 13 arranged on the second substrate 211. In the sheet-like conductor 201, the first detection electrode 12 and the second substrate 211 are bonded by the adhesive sheet 40.

The sheet-like conductor 201 shown in FIG. 5 is formed by bonding first detection electrode 12 formed on the first substrate 111 and the second detection electrode 13 formed on the second substrate 211 by the adhesive sheet 40 so as to be laminated toward the same direction. The sheet-like conductor has the same configuration as that of the sheet-like conductor 101 shown in FIG. 4 except that the arrangements of the second substrate 211 and the second detection electrode 13 are different and thus the same reference numerals are assigned to the same components and the descriptions thereof will be omitted.

Similar to the sheet-like conductor 101 of the above-described second embodiment, the first substrate 111 is arranged on the outer side of the sheet-like conductor 201 (on the upper surface in the drawing) and thus as described above, functions as the protective cover for protecting the first detection electrode 12. In addition, the first substrate 111 may be peeled off from the sheet-like conductor 201 by providing peelability between the first detection electrode and the first substrate 111. In this manner, a sheet-like conductor unit 201a may be formed and used.

Since the adhesive sheet 40 functions as the substrate 11, it is preferable that the adhesive sheet has the same performance as the performance of the substrate 11 as in the above-described sheet-like conductors 101 and 201.

In FIG. 5, plural first detection electrodes 12 and second detection electrodes 13 are used as shown in FIG. 3 and the both detection electrodes are arranged so as to perpendicular to each other as shown in FIG. 3.

According to the sheet-like conductor of the present invention, as described above, by making the line width of the thin metal wire of the first detection electrode on the viewing side larger than the line width of the thin metal wire of the second detection electrode on the opposite side thereto and setting the line width of these thin metal wires to be within a predetermined range, the thin metal wires can be hardly visually recognized.

Further, according to the sheet-like conductor according to the present invention, as described above, by setting the difference between the line width of the thin metal wire of the first detection electrode on the viewing side and the line width of the thin metal wire of the second detection electrode on the opposite side thereto to be within a predetermined range, the thin metal wires can be more hardly visually recognized. With these configurations, the transmittance of the sheet-like conductor is prevented from being lowered.

Thus, in the case in which the user (operator or observer) uses a touch panel display including the sheet-like conductor of the present invention as a touch panel sensor, due to the thin metal wire of the sheet-like conductor, an image on the display screen is not hardly visually recognized and in the case in which the image on the display screen disappears or the case in which the power is not supplied to the touch panel display, the thin metal wire is hardly visually recognized.

The sheet-like conductor and the touch panel of the present invention has been described above in detail but the present invention is not particularly limited to the above embodiments and various improvements and modifications may be made within a range not departing from the spirit of the present invention.

EXAMPLES

Examples

Hereinafter, the present invention will be specifically described based on examples.

First, in the following order, a sheet-like laminate conductor 3 for evaluation in which protective covers 51 and 52 are attached to both sides of the sheet-like conductor 2 shown in FIG. 6 having the same structure as that of the sheet-like conductor 1 shown in FIG. 1 was prepared and used in examples.

Materials, used amounts, ratios, treatment contents and procedures described in the following examples may be properly modified unless departing from the gist of the present invention. Therefore, the scope of the present invention should not be construed to be limited by the following specific examples.

(Preparation of Silver Halide Emulsion)

To Solution 1 below kept at 38° C. and pH 4.5, the amounts corresponding to 90% of each of Solutions 2 and 3 below were added were added simultaneously for 20 minutes with being stirred. In this manner, nucleus particles having a size of 0.16 μm were formed. Subsequently, Solutions 4 and 5 below were added thereto for 8 minutes, and the amounts corresponding to 10% of the rests of Solutions 2 and 3 below were further added thereto for 2 minutes so as to cause the particles to grow up to 0.21 μm in size. Furthermore, 0.15 g of potassium iodide was added thereto, and the resultant was aged for 5 minutes to end the formation of the particles.

Solution 1:

| Water | 750 ml |
|---|---|
| Gelatin | 9 g |
| Sodium chloride | 3 g |
| 1,3-dimethylimidazolidine-2-thione | 20 mg |
| Sodium benzene thiosulfonate | 10 mg |
| Citric acid | 0.7 g |

Solution 2:

| Water | 300 ml |
|---|---|
| Silver nitrate | 150 g |

Solution 3:

| Water | 300 ml |
|---|---|
| Sodium chloride | 38 g |
| Potassium bromide | 32 g |
| Potassium hexachloroiridate(III) hydrate (0.005% in 20% aqueous KCl solution) | 8 ml |
| Ammonium hexachlororhodate (0.001% in 20% aqueous NaCl solution) | 10 ml |

Solution 4:

| Water | 100 ml |
|---|---|
| Silver nitrate | 50 g |

Solution 5:

| Water | 100 ml |
|---|---|
| Sodium chloride | 13 g |
| Potassium bromide | 11 g |
| Yellow prussiate of potash | 5 mg |

Thereafter, water washing by the flocculation method according to the typical method was conducted. Specifically, the temperature was lowered to 35° C., and the pH was reduced using sulfuric acid until silver halide precipitated (precipitation occurred in the pH range of 3.6±0.2). Next, about 3 L of the supernatant was removed (first water washing). Further, 3 L of distilled water was added to the mixture, and sulfuric acid was added until silver halide precipitated. 3 L of the supernatant was removed again (second water washing). The procedure same as the second water washing was repeated once more (third water washing), and water-washing and desalting steps were thus completed. The pH and the pAg of the emulsion after washing and desalting were adjusted to 6.4 and 7.5, respectively, and 3.9 g of gelatin, 10 mg of sodium benzene thiosulfonate, 3 mg of sodium benzene thiosulfinate, 15 mg of sodium thiosulfate, and 10 mg of chloruaric acid were added, followed by applying the chemical sensitization at 55° C. so as to obtain the optimum sensitivity. Thereto, 100 mg of 1,3,3a,7-tetrazaindene as a stabilizing agent, and 100 mg of PROXEL (trade name, manufactured by ICI Co., Ltd.) as a preservative were added. Finally, an emulsion of cubic silver iodochlorobromide particles containing 0.08% by mole of silver iodide, 70% by mole of silver chloride and 30% by mole of silver bromide at a ratio of silver chloride and silver bromide, and having an average particle diameter of 0.22 μm and a coefficient of variation of 9% was obtained.

(Preparation of Photosensitive Layer Forming Composition)

To the above emulsion, $1.2 \times 10^{-4}$ mole/mole Ag of 1,3,3a,7-tetrazaindene, $1.2 \times 10^{-2}$ mole/mole Ag of hydroquinone, $3.0 \times 10^{-4}$ mole/mole Ag of citric acid, and 0.90 g/mole Ag of 2,4-dichloro-6-hydroxy-1,3,5-triazine sodium salt were added, followed by adjusting the pH of the coating solutions so as to be 5.6 using citric acid. Thus, a photosensitive layer forming composition was obtained.

(Photosensitive Layer Forming Process)

Figure 6:
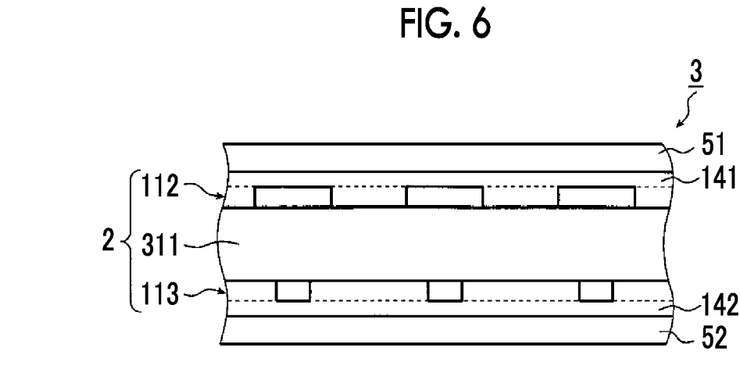
FIG. 6 is a schematic partial cross-sectional view showing a conductive sheet for evaluation in which protective covers are placed on the surface and the rear surface.

A gelatin layer having a thickness of 0.1 μm was formed on both surfaces of a polyethylene terephthalate (PET) sheet having a width of 30 cm and a thickness of 100 μm, which becomes a substrate 311 of a sheet-like conductor 2 of the sheet-like laminate conductor 3 for evaluation shown in FIG. 6, as an undercoat, and further, an antihalation layer including a dye discolored by alkali of a developing solution with an optical density of about 1.0 was provided on the undercoat.

The photosensitive layer forming composition was applied to the antihalation layer with a width of 25 cm and a length of 20 cm, and a gelatin layer having a thickness of 0.15 μm was further provided. The both end portions having width of 3 cm were cut off so as to leave the center portion of the applied composition having a width of 24 cm to obtain a PET sheet on which a photosensitive layer was formed on both surfaces. In the photosensitive layer formed on the PET sheet with the photosensitive layer, the amount of silver was 4.8 g/m$^2$ and the amount of gelatin was 1.0g/m$^2$.

(Exposure and Development Process)

Photo masks for electrode patterns of a first detection electrode 112 (the upper surface in the drawing) and a second detection electrode 113 (the lower surface in the drawing), which will be described later, were prepared and the PET sheet with the photosensitive layer was exposed through these photo masks using parallel light from a high pressure mercury lamp as a light source. After the exposure, the sheet was developed with the following developing solution and further a development treatment was carried out using a fixing solution (product name: N3X-R for CN16X, manufactured by Fujifilm Corporation). Furthermore, the sheet was rinsed with pure water and dried. Thus, the sheet-like conductor 2 including the first detection electrode 112 and the second detection electrode 113 formed of thin Ag wires formed on the both surfaces of the substrate 311 was obtained.

(Electrode Pattern)

The electrode patterns of the first detection electrode 112 and the second detection electrode 113 are as follows.

Electrode pattern of the first detection electrode 112: Square having a length of one side of each lattice of 400 μm, a crossing angle of the thin Ag wire constituting the mesh of 90°, and a line width of the thin Ag wire of 5.5 μm.

Electrode pattern of second detection electrode 113: Same as the pattern of the first detection electrode 112 except that the line width of the thin Ag wire is 3 μm.

In addition, in the obtained sheet-like conductor 2, the first detection electrode 112 and the second detection electrode 113 are composed of thin Ag wires crossing in a mesh shape. As described above, the first detection electrode 112 is an electrode extending in the x direction and the second detection electrode 113 is an electrode extending in the y direction. Each electrode are arranged on the substrate 311 (PET sheet) with a pitch of 4.5 mm.

Next, the sheet-like laminate conductor 3 for evaluation was prepared.

The obtained sheet-like conductor 2 was used and a transparent adhesive (OCA: Optical Clear Adhesive) sheet formed of a protective cover having a thickness of 100 μm and an pressure sensitive adhesive layer was arranged on both outer sides of the sheet-like conductor 2 (the upper and lower surfaces in the drawing) with a glass substrate having a thickness of 5 mm interposed therebetween. The layers were laminated from the both surfaces using a 2 kg roller. Then, the obtained sheet-like conductor with the transparent adhesive sheet was put into a high pressure thermostat and subjected to a defoaming treatment in an environment of 40° C. and 5 atmospheres for 20 minutes.

In this manner, as shown in FIG. 6, the sheet-like laminate conductor 3 for evaluation in which the first protective cover 51, a first pressure sensitive adhesive layer 141, the first detection electrode 112, the substrate 311, the second detection electrode 113, the second pressure sensitive adhesive layer 142, and a second protective cover 52 are laminated sequentially from on the viewing side (the upper side in the drawing) to the opposite side thereto (the lower side in the drawing) was obtained.

The sheet-like laminate conductor 3 for evaluation thus obtained was cut into a rectangular shape having a size of 4 cm×5 cm and used in Example 1.

The line widths of the electrode patterns of the first detection electrode 112 and the second detection electrode 113 were each obtained by collecting a sample of the sheet-like laminate conductor 3 for evaluation from a surface of the thin metal wire perpendicular to the extending direction, and measuring the horizontal width of the cross section of the thin wire (the maximum width in a direction horizontal to the substrate) using an electron microscope (an average value of 10 places). In addition, the line widths of the electrode patterns of the photo mask actually prepared were measured using an electron microscope. As a result, it was confirmed that the line width of the thin metal wire of the first detection electrode 112 and the line width of the thin metal wire of the second detection electrode 113 of the sheet-like laminate conductor 3 for evaluation were equal to the line widths of the electrode patterns of the respectively corresponding above photo masks.

Using photo masks having electrode patterns of different line widths, as shown in Table 1 below, sheet-like laminate conductors 3 for evaluation in which the line width of the thin wire of the first detection electrode (hereinafter, also referred to as "upper surface line width") and the line width of the thin wire of the second detection electrode (hereinafter, also referred to as "lower surface line width") were respectively changed were prepared and predetermined rectangular shapes were cut and used in Examples 2 to 11 and Comparative Examples 1 to 5.

TABLE 1

| | Lower surface line width (μm) | Upper surface line width (μm) | Upper surface line width − lower surface line width (μm) | Evaluation point | Transmittance |
|---|---|---|---|---|---|
| Example 1 | 3 | 5.5 | 2.5 | 2 | 87.7 |
| Example 2 | 2.4 | 4.9 | 2.5 | 2 | 88.2 |
| Example 3 | 4.39 | 4.83 | 0.44 | 2 | 87.8 |
| Example 4 | 3.8 | 4.06 | 0.26 | 2 | 88.2 |
| Example 5 | 4.57 | 4.83 | 0.26 | 2.5 | 87.9 |
| Example 6 | 3.5 | 4.77 | 1.27 | 3 | 88.2 |
| Example 7 | 2.44 | 4.18 | 1.74 | 3.5 | 88.5 |
| Example 8 | 3.6 | 4.51 | 0.91 | 4 | 88.3 |
| Example 9 | 3.21 | 4.04 | 0.83 | 4 | 89.2 |
| Example 10 | 2.86 | 4.03 | 1.17 | 4 | 88.9 |
| Example 11 | 2.65 | 3.55 | 0.9 | 4 | 89.1 |
| Comparative Example 1 | 4.51 | 3.6 | −0.91 | 1 | 88.2 |
| Comparative Example 2 | 4.03 | 2.86 | −1.17 | 1 | 88.9 |
| Comparative Example 3 | 4.49 | 4.22 | −0.27 | 1.5 | 87.7 |
| Comparative Example 4 | 5.5 | 4.85 | −0.65 | 1.5 | 87.3 |
| Comparative Example 5 | 2.5 | 6.7 | 4.2 | 1.5 | 87.4 |

(Evaluation)

Each of Examples 1 to 11 and Comparative Examples 1 to 5 above was mounted on a black plate while directing the second detection electrode 113 downward, and in a state in which each conductor was irradiated with white light from the upper side, each sheet-like laminate conductor 3 was visually observed at a height 30 cm to 50 cm away from each sheet-like laminate conductor 3 for evaluation and a depression angle of 45°.

At this time, for the visibility of the thin metal wire, functional evaluations were respectively carried out by two researchers based on the evaluation criteria in which a level at which the thin metal wire is clearly observed was evaluated as "1", a level at which the thin metal wire is slightly observed but is ignorable was evaluated as "2", a level at which the thin metal wire is rarely observed was evaluated as "3", and a level at which the thin metal wire is not observed was evaluated as "4", and the average value thereof was obtained and used as an evaluation point. Here, an allowable evaluation point of visibility of the thin metal wire in the present invention is "2" or greater.

In addition, the transmittance of Examples 1 to 11 and Comparative Examples 1 to 5 above was measured using a spectrophotometer in order to confirm whether the transparency is good or not.

Figure 7:
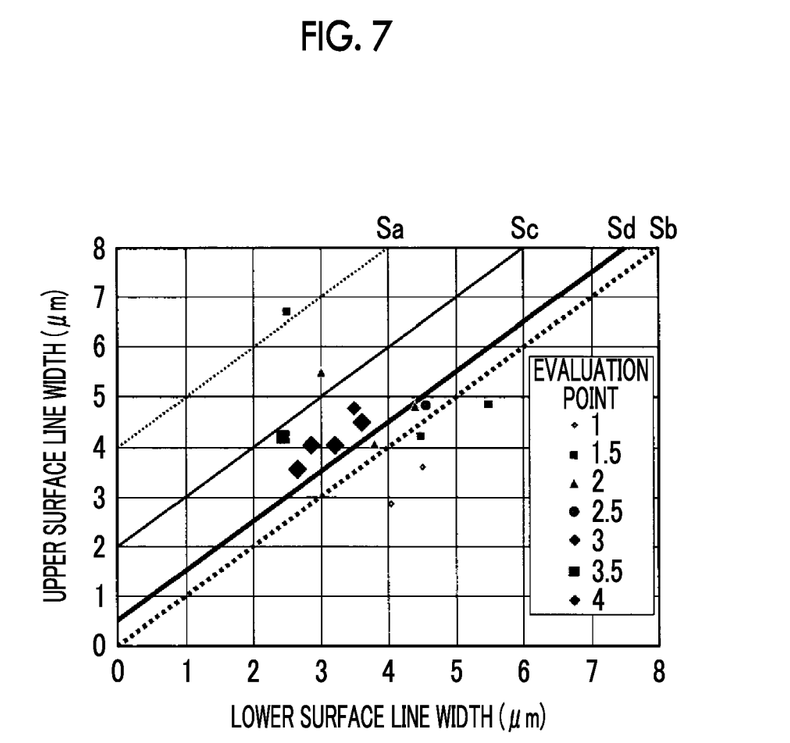
FIG. 7 is a graph showing a relationship between a line width Wa of a thin metal wire of the first detection electrode and a line width Wb of a thin metal wire of the second detection electrode, and the visibility of the sheet-like conductor.

The above evaluation results on visibility and the measured transmittance were collectively shown in Table 1 and regarding the evaluation results on visibility, while setting the lower surface line width to an x axis and the upper surface line width to a y axis, a graph shown in FIG. 7 was plotted.

A range between the dotted lines Sa-Sb in FIG. 7 is the range expressed by the above expression (2), and a range between the solid lines Sc-Sd in FIG. 7 is the range expressed by the above expression (3).

As shown in Table 1 and FIG. 7, Examples 1 to 11, in which the above expressions (1) and (2) are satisfied, that is, both the upper surface line width and the lower surface line width are 0.5 μm or more and 10 μm or less, the upper surface line width is larger than the lower surface line width and, the difference between the upper surface line width and the lower surface line width is 4 μm or less, had an evaluation point of 2 or greater and the level of the visibility of the thin metal wire was allowable, or the visibility was good. In contrast, Comparative Examples 1 to 4 in which the above expression (1) or (2) is not satisfied, that is, the upper surface line width is smaller than the lower surface line width, and Comparative Example 5 in which the upper surface line width is excessively larger than the lower surface line width and the difference therebetween is too large had an evaluation point of 1.5 or less and the level of the visibility of the thin metal wire was not allowable. That is, it is found that the thin metal wire is less likely to be visually recognized or hardly visually recognized and the visibility is improved in Examples 1 to 11 compared to Comparative Examples 1 to 5.

In addition, Examples 6 to 11 in which the above expression (3) is satisfied, that is, the difference between the upper surface line width and the lower surface line width is 0.5 μm or more and 2.0 μm or less had an evaluation point of 3 or greater and Examples 1 to 5 in which the difference between the upper surface line width and the lower surface line width is less than 0.5 μm or exceeds 2.0 μm and had an evaluation point of 2.5 or less. The evaluation points of Examples 6 to 11 were higher than that the evaluation points of Examples 1 to 5. That is, it is found that by further limiting the range of the difference between the upper surface line width and the lower surface line width, the visibility of the thin metal wire can be set to a level at which the thin metal wire is not completely visually recognized or hardly visually recognized and the visibility can be further improved.

As described above, it is found that from examples of the present invention that by making the line width of the first detection electrode on the viewing side (for example, the upper surface detection electrode) larger than the line width of the thin metal wire of the second detection electrode on the opposite side thereto (for example, the lower surface detection electrode) and setting these line widths of the first detection electrode and the second detection electrode to be within predetermined ranges, and setting the difference between the line widths of the both electrodes to be within predetermined ranges, without deteriorating the transmittance, the visibility of the thin metal wire can be set to a level at which the thin metal wire is not completely visually recognized or hardly visually recognized or an ignorable level, and the visibility can be improved.

From the above results, the effect of the present invention is clear.

EXPLANATION OF REFERENCES 1, 2, 101, 201: sheet-like conductor
3: sheet-like laminate conductor for evaluation
10: electrostatic capacitive type touch panel sensor
11, 311: substrate
12, 112: first detection electrode (upper surface detection electrode)
12N: thin metal wire
13, 113: second detection electrode (lower surface detection electrode)
13N: thin metal wire
22: first lead-out wiring
23: second lead-out wiring
31: flexible printed wiring board
40: adhesive sheet
51: first protective cover
52: second protective cover
111: first substrate
141: first pressure sensitive adhesive layer
142: second pressure sensitive adhesive layer
211: second substrate
E0: outer side area
E1: detection area
Pa, Pb: inter-wire pitch
Wa, Wb: line width
g1, g2: lattice

What is claimed is:

1. A sheet-like conductor that is arranged on a display screen, the conductor comprising at least:
an insulator;
a first detection electrode, that is placed on a first surface of the insulator further away from the display screen, and arranged on a viewing side of an observer; and
a second detection electrode, that is placed on a second surface of the insulator closer to the display screen, and arranged on an opposite side to the viewing side,
wherein the first detection electrode and the second detection electrode are formed of thin metal wires in a mesh shape, and
wherein a line width of the thin metal wire of the first detection electrode is a line width Wa and a line width of the thin metal wire of the second detection electrode is a line width Wb, the line width Wa and the line width Wb satisfy the following expressions (1) and (2):

$$0.5\ \mu m \leq Wb < Wa \leq 10\ \mu m \tag{1}$$

$$0.26\ \mu m \leq Wa - Wb \leq 4.0\ \mu m \tag{2}$$

2. The sheet-like conductor according to claim 1, wherein the line width Wa and the line width Wb have a relationship of the following expression (3):

$$0.5\ \mu m \leq Wa - Wb \leq 2.0\ \mu m \tag{3}$$

3. The sheet-like conductor according to claim 2, wherein the line width Wa and the line width Wb satisfy the following expression (4):

$$1.0\ \mu m \leq Wb < Wa \leq 6.0\ \mu m \tag{4}$$

4. The sheet-like conductor according to claim 3, wherein an electrode width of the first detection electrode is smaller than an electrode width of the second detection electrode.

5. The sheet-like conductor according to claim 2, wherein an inter-wire pitch between the thin metal wires of each of the first detection electrode and the second detection electrode is 100 μm to 500 μm.

6. The sheet-like conductor according to claim 2, wherein an electrode width of the first detection electrode is smaller than an electrode width of the second detection electrode.

7. The sheet-like conductor according to claim 1, wherein the line width Wa and the line width Wb satisfy the following expression (4):

$$1.0\ \mu m \leq Wb < Wa \leq 6.0\ \mu m \tag{4}$$

8. The sheet-like conductor according to claim 7, wherein an inter-wire pitch between the thin metal wires of each of the first detection electrode and the second detection electrode is 100 μm to 500 μm.

9. The sheet-like conductor according to claim 7, wherein an electrode width of the first detection electrode is smaller than an electrode width of the second detection electrode.

10. The sheet-like conductor according to claim 1, wherein an inter-wire pitch between the thin metal wires of each of the first detection electrode and the second detection electrode is 100 μm to 500 μm.

11. The sheet-like conductor according to claim 10, wherein an electrode width of the first detection electrode is smaller than an electrode width of the second detection electrode.

12. The sheet-like conductor according to claim 1, wherein an electrode width of the first detection electrode is smaller than an electrode width of the second detection electrode.

13. A touch panel using the sheet-like conductor according to claim 1.

14. A sheet-like conductor comprising at least:
an insulator;
a first detection electrode that is placed on a first surface of the insulator; and
a second detection electrode that is placed on a second surface of the insulator, wherein the second surface is opposite of the first surface,
wherein the first detection electrode and the second detection electrode are formed of thin metal wires in a mesh shape,
wherein a line width of the thin metal wire of the first detection electrode is a line width Wa and a line width of the thin metal wire of the second detection electrode is a line width Wb, the line width Wa and the line width Wb satisfy the following expressions (1) and (2):

$$0.5\ \mu m \leq Wb < Wa \leq 10\ \mu m \tag{1}$$

$$0.26\ \mu m \leq Wa - Wb \leq 4.0\ \mu m \tag{2; and}$$

an electrode width of the first detection electrode is smaller than an electrode width of the second detection electrode.

15. The sheet-like conductor according to claim 14, wherein the line width Wa and the line width Wb have a relationship of the following expression (3):

$$0.5\ \mu m \leq Wa - Wb \leq 2.0\ \mu m \tag{3}$$

16. The sheet-like conductor according to claim 15, wherein the line width Wa and the line width Wb satisfy the following expression (4):

$$1.0\ \mu m \leq Wb < Wa \leq 6.0\ \mu m \tag{4}$$

17. The sheet-like conductor according to claim 15, wherein an inter-wire pitch between the thin metal wires of each of the first detection electrode and the second detection electrode is 100 μm to 500 μm.

18. The sheet-like conductor according to claim 14, wherein the line width Wa and the line width Wb satisfy the following expression (4):

$$1.0\ \mu m \leq Wb < Wa \leq 6.0\ \mu m \tag{4}$$

19. The sheet-like conductor according to claim 14, wherein an inter-wire pitch between the thin metal wires of each of the first detection electrode and the second detection electrode is 100 μm to 500 μm.

20. A touch panel using the sheet-like conductor according to claim 14.

* * * * *